United States Patent
Ren et al.

(10) Patent No.: US 7,363,409 B2
(45) Date of Patent: Apr. 22, 2008

(54) INTERRUPT CONTROL SYSTEM AND METHOD FOR REDUCING INTERRUPT LATENCY

(75) Inventors: Jing-Fei Ren, Plano, TX (US); Ping Tao, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 64 days.

(21) Appl. No.: 11/350,327

(22) Filed: Feb. 8, 2006

(65) Prior Publication Data
US 2007/0186022 A1    Aug. 9, 2007

(51) Int. Cl.
*G06F 13/24* (2006.01)
(52) U.S. Cl. .................. 710/260; 710/267; 710/268
(58) Field of Classification Search ........ 710/260–269, 710/48–51
See application file for complete search history.

(56) References Cited

U.S. PATENT DOCUMENTS

| | | | |
|---|---|---|---|
| 5,745,772 A | 4/1998 | Klein | |
| 6,029,223 A | 2/2000 | Klein | |
| 6,742,065 B1 | 5/2004 | Suh | |
| 6,889,279 B2 * | 5/2005 | Godfrey | ............... 710/269 |
| 2002/0144099 A1 | 10/2002 | Muro, Jr. et al. | |
| 2003/0101301 A1 | 5/2003 | Taniguchi | |
| 2003/0110336 A1 | 6/2003 | Park et al. | |

OTHER PUBLICATIONS

"CW001105 ARM966E-S Microprocessor Core Preliminary Datasheet", LSI Logic Corporation, Oct. 2001, pp. 1-32 (Arthur Unknown).

* cited by examiner

*Primary Examiner*—Raymond N Phan
(74) *Attorney, Agent, or Firm*—Steven A. Shaw; W. James Brady; Frederick J. Telecky, Jr.

(57) ABSTRACT

An interrupt control system is disclosed. The interrupt control system can include control logic that provides at least one interrupt request signal to a processor in response to at least one event signal. The control logic provides at least one computer executable instruction to a processor in response to detecting an instruction request from the processor corresponding to an interrupt response.

15 Claims, 3 Drawing Sheets

INTERRUPT CONTROL SYSTEM AND METHOD FOR REDUCING INTERRUPT LATENCY

TECHNICAL FIELD

The present invention relates to a computer interrupts, and more particularly to an interrupt control system and method for reducing interrupt latency.

BACKGROUND

Generally, computer systems support interrupts. Interrupts are used to inform computer processors of an occurrence of irregular and exceptional events. Interrupts are usually the result of an event occurring in an external to a central processor such as from an event occurring in peripheral device. Additionally, an event could occur from an internal component that operates in an asynchronous manner. Interrupts typically require a processor to stop executing the normal instruction routine temporarily and switch to an Interrupt Service Routine (ISR), which can be stored in instruction random access memory (I-RAM), and is specifically designed to handle the interrupt and then return and resume the normal instruction routine. The interrupt latency can be defined as the time required by the processor to start executing the ISR after it senses an interrupt.

A conventional method for informing a processor of an interrupt is to apply an interrupt signal to the processor. Interrupt signals can differ from one processor to another. For example, in an Advanced RISC Machines (ARM) processor, two different types of interrupt request signals exist, namely, Fast Interrupt Request (FIQ) and Interrupt Request (IRQ). FIQ signals are generally used for interrupt events that have a high priority, such as network controllers. IRQ signals are used for interrupt events are generally used for signals with normal priority levels, such as keyboard commands.

As the interrupt can be generated in a variety of peripheral devices external to the processor, an interrupt control system is usually used for collecting interrupt signals received from a plurality of interrupt sources and sending the interrupt signals to the processor as interrupt request signals. Typically, when the processor senses the interrupt request, it responds to the request by branching to a predefined IRQ address in the I-RAM. When the processor executes the special instruction stored at the IRQ address, the processor is instructed to branch to another address where a global interrupt handling routine is stored. The global interrupt handling routine includes instructions that, when executed, cause the processor to a) access register(s) to interrogate the interrupt source, b) perform a table-look-up to find the address of the ISR that handles the interrupting event, and c) branch to the particular ISR address.

A processor can also use a vectored interrupt controller (VIC) that performs a vectored interrupt control function. Usually, addresses of the individual ISRs are stored in the VIC as interrupt vectors. The VIC collects interrupts generated in a plurality of peripheral devices and informs the processor of the interrupts. Meanwhile, the ISR address corresponding to the active interrupt is executed accordingly. When the processor receives an interrupt request signal from the VIC, that processor will issue an interrupt response by accessing the special interrupt vector address. Unlike the non-vectored interrupt, the instruction stored at the interrupt vector address instructs the processor to fetch the ISR address in the VIC that was activated. When the processor receives the requested address, the processor will construct a branch instruction using this ISR address. The processor will then execute the branch instruction which will direct the processor to the appropriate ISR.

SUMMARY

The present invention relates to an interrupt control system that includes control logic that provides at least one interrupt request signal to a processor in response to at least one event signal. The control logic provides at least one computer executable instruction to a processor in response to detecting an instruction request from the processor corresponding to an interrupt response.

The present invention also relates to an interrupt control system that includes means for detecting at least one event signal and for providing an interrupt signal to a processor in response to the at least one event signal. The system also includes means for providing at least one computer executable instruction to the processor in response to detecting an interrupt response from the processor.

The present invention further relates to a method for controlling interrupt events. The method includes receiving at least one event signal from a peripheral device, and providing an interrupt request signal to a processor in response to the event signal. An instruction request sent from the processor to an instruction random access memory (I-RAM) is detected. At least one computer executable instruction that is associated with the at least one event signal and that is responsive to the instruction request is retrieved, and the at least one computer executable instruction is provided to the processor.

DETAILED DESCRIPTION

The present invention relates to a fast and efficient method of handling interrupt events in a computer system. An interrupt event (hereinafter "event") can be initiated by a device or component that is external to a computer system. Such devices include, but are not limited to a keyboard, modem, expansion card, and network controller. Additionally or alternatively, an event can be initiated by a device internal to a computer system, such as a graphics co-processor core or memory. To initiate the events, the external or internal devices typically provide an event signal to an interrupt control system. The event signal provides an indicator that the peripheral device or component requires use of system resources, namely one or more processor cores. Events are usually asynchronous in nature, while processor cores are usually synchronous in nature. Thus, the interrupt control system operates to notify the processor that an event has occurred, so that a processor core can execute the appropriate computer instructions, referred to as an interrupt service routine (ISR), required to process the event. The time from which the event occurs until the appropriate ISR is executed is referred to as the interrupt latency time. Many applications require that interrupt latency time be reduced as much as possible. One such application that needs minimal interrupt latency time is the implementation of ultra wideband media access control (UWB MAC) devices. The present invention reduces the interrupt latency time by having an interrupt control system detect a set of particular instructions from the processor core (hereinafter "core") to instruction random access memory (I-RAM). The interrupt control system provides the core with the computer executable instructions that includes a branch instruction such that the processor can branch directly to an interrupt service routine (ISR) that provides the computer instructions for processing the event.

Figure 1:
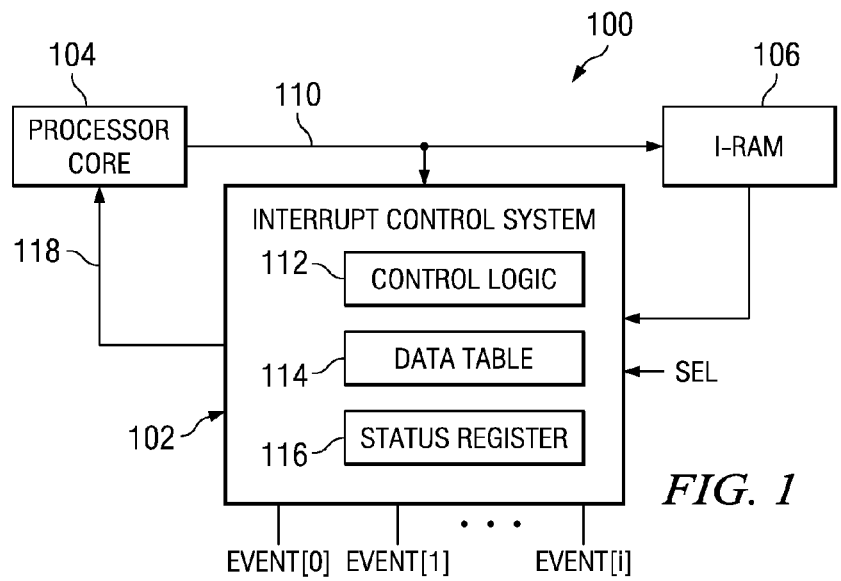
FIG. 1 illustrates a block diagram of an interrupt system in accordance with an aspect of the invention.

FIG. 1 illustrates an example of a computer system 100 for reducing interrupt latency time during the processing of an event in accordance with an aspect of the invention. An interrupt control system 102 is connected between a core 104 and I-RAM 106. The interrupt control system 102 receives any number of event signals indicated at EVENT[0] through EVENT[i], wherein i is a positive integer greater than or equal to one denoting the number of event signals in the input vector. There can be any number of event signals, but in a typical computer system, there will be 32 or less event signals. The core 104 is connected to the I-RAM 106 via an instruction request bus 110. The interrupt control system 102 monitor the instruction request bus 110 can provide signals from the core 104 to the I-RAM 106.

The interrupt control system 102 includes control logic 112 and a data table 114. The data table 114 stores ISR branch instructions for particular events. The branch instructions, when executed by the core 104, direct the core 104 to the ISR associated with the particular event. For example, the data table 114 can be implemented as an ISR table (e.g., in random access memory, such as dynamic or static RAM) that stores branch instructions associated with each of the peripheral devices that provide the respective event signals. As described herein, the interrupt control system 102 is configured to provide a computer executable instruction (e.g., a branch instruction) in response to detecting an interrupt response from the core 104 on the bus 110.

Each event signal EVENT[0] through EVENT[i] can have an assigned priority level. Additionally or alternatively, each event signal can have an assigned priority class. As one example, there can be two priority classes, an interrupt request (IRQ) and a fast interrupt request (FIQ); although, it is to be understood that more or less priority classes could be employed. Event signals belonging to the FIQ class typically have a higher priority than event signals belonging to the IRQ class. Further, within each respective class, there can be multiple event signals with different priority levels. The event signal with a highest priority will typically be the event signal that has a highest priority level within the highest priority class. The event signal with the highest priority can be processed first, followed by the event signal with the second highest priority, etc., until all event signals have been processed. The control logic 112 can thus correspond to means for detecting activation of one or more event signals and for providing an appropriate interrupt request signal (e.g., an IRQ or FIQ) to the core 104 in response to the event signals.

The interrupt control system 102 also includes a status register 116 that stores the status of the events. The status register 116 includes a status field for each event signal, wherein each status field can indicate whether or not an associated event signal has been activated. The control logic 112 can signal the core 104 via the interrupt request signal indicating that at least one event has occurred. The control logic 112 can detect signals from the core 104 and the I-RAM 106. The control logic 112 also includes logic for determining the event with a highest priority. The control logic 112 obtains computer executable instructions from the data table 114 and the I-RAM 106. The control logic can also include circuitry or other means for receiving an instruction signal from the I-RAM 106. The control system is configured to selectively provide one of the instruction signal received from the I-RAM 106 and the computer executable instructions from the data table 114 to the core 104, as indicated at 118. For instance, the control logic 112 can include logic configured for selectively providing either the signal received from the data table 114 or the I-RAM 106 to the core 104 via 118.

As an example of operation of the computer system illustrated in FIG. 1, the computer system 100 can be operated in a normal mode of operation or in an interrupt mode of operation. In the normal mode of operation (e.g., no event has occurred), the interrupt control system 102 is a passive device. The core 104 will signal the I-RAM 106 with an instruction fetch to provide computer executable instructions from a predetermined memory location of the I-RAM. Assuming no event signal has been activated (e.g., no interrupts), the interrupt control system 102 will receive an instruction signal from the I-RAM 106 and pass the instruction signal to the core 104.

When one or more events have occurred, the computer system 100 enters the interrupt mode of operation. When an event signal is activated, the control logic 102 provides an interrupt request signal to the core 104. The core 104 responds to the interrupt request signal with an instruction fetch from a special memory address referred to as an interrupt vector address. The control logic 112 can determine if the instruction fetch on the bus 110 is indicative of the core responding to an interrupt request.

By way of further example, the control logic 112 examines the instruction fetch address on the bus 110 to determine if the address is a request for a memory at one of a predefined set of memory locations (e.g., for an Advanced RISC Machines (ARM) processor, 0x18 for an event from the IRQ and 0x1F for an event signal from the FIQ class). When an interrupt response signal is detected on the bus 110, the control logic 112 examines the status register 116 to determine which event signal has the highest priority level. The control logic 112 receives the branch instruction for the ISR of the event with the highest priority level from the data table 114. The control logic 112 in turn provides the branch instruction to the core 104, as indicated at 118. The control logic 112 may also receive a response to the interrupt response signal from the I-RAM 106, referred to as the I-RAM interrupt response. The interrupt control system 102 can block (or ignore) the I-RAM interrupt response as the corresponding branch instruction is provided from the internal data table 114. After the branch instruction has been provided from the data table 114 to the control logic 112, the status field within the status register 116 containing the indication that the particular event signal has been activated can be reset (e.g., by the control logic 112) such that the event with the next highest priority will now have the highest priority. The core 104 can then execute the branch instruction and implement the ISR. This process can be repeated until there are no events left to process. After the last event has been processed, the control logic 112 deactivates the interrupt request signal to the core 104, indicating that no further event signal need to be processed. When the interrupt signal is deactivated, the computer system 100 will return to normal mode.

It is to be understood that the interrupt control system 102 could be selectively enabled and disabled. The interrupt control system 102 could be disabled by, for example, a selection (SEL) signal. For instance, if the SEL signal is activated to a particular logic state, the control logic is configured to pass the instruction signal provided by the I-RAM 106 to the core 104, regardless of the nature of the interrupt response signal. The SEL signal can be programmatically set by hardware or software and able to vary during operation of the computer system 100. Alternatively, the SEL signal can be a permanent hardwired feature, such as may be set by the manufacturer (e.g., during a burn-in process).

Figure 2:
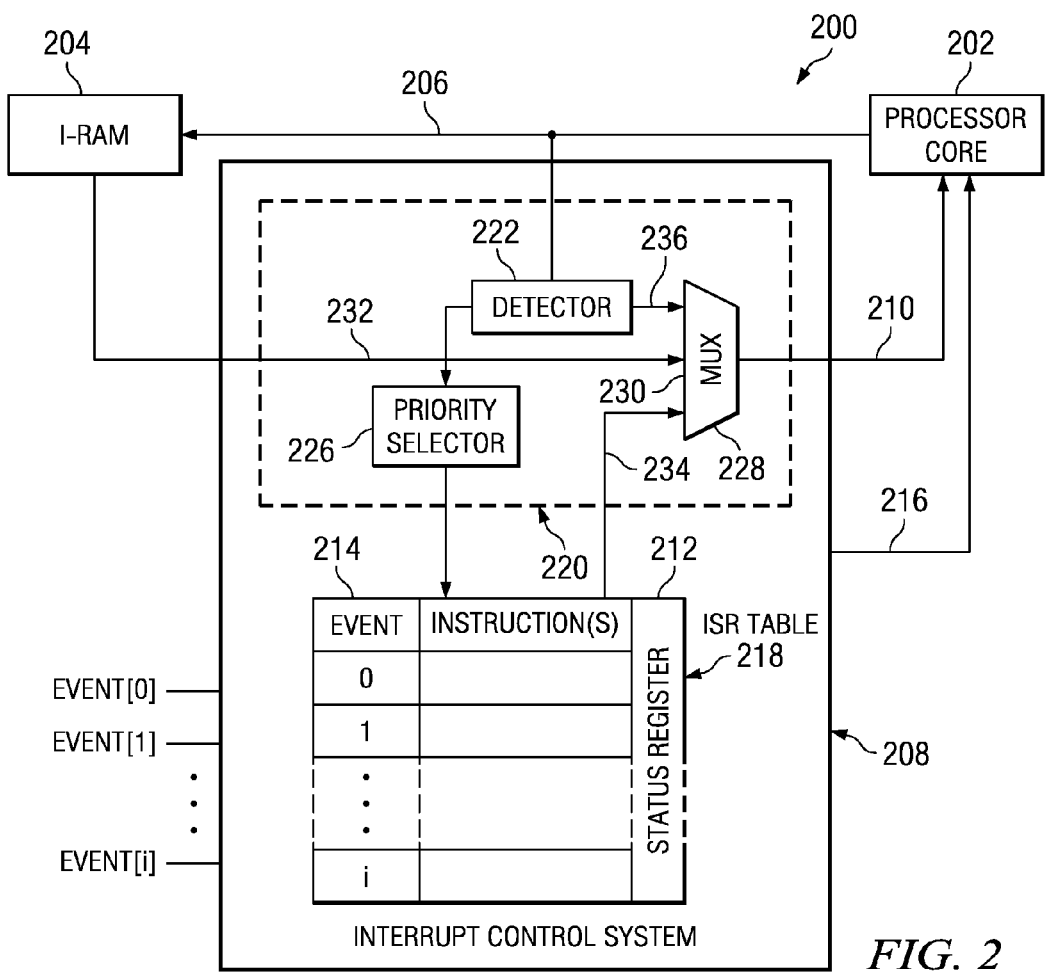
FIG. 2 illustrates another example of an interrupt system in accordance with an aspect of the invention.

FIG. 2 illustrates another example of a computer system 200 for reducing interrupt latency time in accordance with an aspect of the invention. The computer system 200 includes at least one core 202 and an I-RAM 204. In the present example, the core 202 could be implemented as an ARM processor. ARM processors are commonly implemented in small consumer and industrial electronic systems including, but not limited to wireless phones, microcontrollers and networking controllers. The core 202 can provide instruction request signals to the I-RAM 204 on an instruction request bus 206. An interrupt control system 208 is connected between the core 202 and the I-RAM 204. In the present example, the interrupt control system 208 could be implemented as a vectored interrupt controller (VIC); however, other forms of interrupt controllers could be used. A VIC is a controller that can provide the core 202 with a signal indicating that an event signal has been activated, and can identify which event signal has been activated. The interrupt control system 208 receives signals from the I-RAM 204 and can detect signals sent from the core 202 to the I-RAM 204 via the instruction request bus 206. Additionally, the interrupt control system 208 can provide instruction signals to via an instruction bus 210 of the core 202.

The interrupt control system 208 includes a status register 212 that tracks the status of a plurality of event signals indicated at EVENT[0] through EVENT[i], where i is a positive integer greater than or equal to one denoting the number of interrupt inputs. There can be any number of event signals, but ordinarily there are 32 or less event signals on the computer system 200. As stated above, the event signals can be activated by external peripheral devices, and/or by internal devices. The status register 212 includes a status field for each of the plurality of event signals to indicate that a particular event signal has been activated. The status register 212 can be a separate data structure, or alternatively, the status register could be implemented as a field in a data table 214.

When a given one of event signals is activated, a status field in the status register 212 corresponding to the associated event is set to a value indicating that the given event signal has been activated. When the event signal is no longer activated, the status field for the associated event can be reset. The status field can be implemented as one or more bits of memory at a predetermined memory location that is operative to indicate that a particular event signal has been received. Each event signal can include a predetermined priority level relative to other event signals. Each event signal can also be assigned to a predetermined priority class. As an example, event signals in a first priority class, FIQ, have a higher priority than event signals of a second class, IRQ. Additionally, event signals within the same class can be assigned priority levels (which can be the same or different levels) to indicate the priority level of the event signal relative to other event signals of the same class.

The interrupt control system 208 can provide the core 202 with an interrupt request signal 216 indicating that at least one event signal has been activated. Optionally, the interrupt control system 208 can provide separate interrupt request signals. For example, the interrupt control system 208 could provide a different interrupt request signal for each different priority class.

The interrupt control system 208 includes the data table 214 that stores at least one computer executable instruction for each event. For instance, the at least one computer executable instruction can be implemented as a branch instruction. The branch instruction, when executed by the core 202, branches the core to the appropriate ISR. Thus, the data table 214 can be implemented as an ISR table 218. The branch instructions stored in the ISR table 218 are typically loaded into the ISR table 218 upon the initialization of the computer system.

The interrupt control system 208 further includes control logic 220 for controlling the interrupt control system 208. The control logic 220 includes a detector 222 for detecting and interpreting the signals sent from the core 202 to the I-RAM 204 on the instruction request bus 206. The control logic 220 further includes a priority selector 226 that can select the event with a highest priority level. The control logic 220 can also include a switch 228 that is operative to connect either a branch instruction from the ISR table 218 or an instruction signal from the I-RAM 204 to the bus 210. The switch can be controlled based on the signal in the instruction request bus 206. Thus, the detector 222 can be configured to control the switch 228 to selectively provide one of the branch instruction from the ISR table 218 or the instruction signal from the I-RAM 204 to the core in response to the signal provided on the bus 206.

The switch 228 can be implemented, for example, as a multiplexer 230 that includes the I-RAM output 232 and the ISR table output 234 as inputs. The output of the multiplexer can be connected to the instruction bus 210 of the core 202. The detector 222 provides a control signal 236 to a selection input of the multiplexer 230 that controls the output of the multiplexer 230. That is, one output from the detector 222 results in the I-RAM output being passed directly to the bus 210 and another detector output causes the branch instruction to be provided to the bus 210.

As an example of operation of the computer system 200, the computer system 200 can operate in a normal mode of operation or an interrupt mode of operation. In the present example, the normal mode of operation is a mode of operation wherein the computer system 200 has no event signals activated. In a normal mode of operation, the core 202 intermittently sends instruction request signals to the I-RAM 204. In response to the instruction request signals, the I-RAM 204 provides one or more computer executable instructions to the interrupt control system 208 in the form of an instruction signal. Assuming no event signal has been detected, the detector controls the switch 228 to pass the instruction signal directly from the I-RAM 204 to the core 202.

When one or more event signals are activated, the computer system 200 operates in the interrupt mode of operation. As stated above, when at least one event signal is activated, the corresponding status field in the status register 212 is set to indicate that a particular event signal has been activated. When at least one event signal has been activated, the interrupt control system 208 provides the core 202 with an interrupt request signal (e.g., IRQ or FIQ) 216 that informs the core that an event signal has been activated and needs to be processed.

In response to the interrupt request signal 216, the core 202 issues a special type of instruction request signal to the I-RAM 204, such as can be referred to as an interrupt response signal. In most protocols, the interrupt response signal contains a fetch instruction request (e.g., the type of request, such as a read request) and an instruction fetch address (e.g., corresponding to the memory location in the I-RAM). In the present example, the interrupt control system 208 detects this interrupt response signal at the detector 222. The detector 222 examines the detected signal on the bus 206 to determine if the detected signal is an interrupt response signal as opposed to a different type of instruction request signal. The determination can be made based on detecting the instruction fetch address at one or more predefined memory locations. If the detected signal is not an interrupt response signal, the detector 222 will provide the control signal 236 to the multiplexer 230 to cause the multiplexer 228 to pass the instruction signal directly from the I-RAM 204 to the core 202, as described above. However, if the detected signal on the bus 206 is an interrupt response signal, the detector 222 controls the priority selector 226 to select the active event having the highest priority level. The priority selector 226 can access the status register 212 to ascertain which event has the highest priority level. The ISR table 218 in turn provides the multiplexer 230 with the branch instruction for the ISR associated with the event signal having the highest priority level. The detector 222 also controls the multiplexer 230 to selectively provide the branch instruction to the core 202 in response to the detecting the interrupt response signal on 206. The instruction signal sent from the I-RAM 204 to the multiplexer 230 in response to the interrupt response signal sent by the core 202 can be blocked by the multiplexer 218. The processor 202 can execute the branch instruction from the interrupt control system 208.

After the branch instruction has been provided to the multiplexer 230, the status register 212 can reset the status field of the event corresponding to the branch provided to the multiplexer 230. If the status register 212 still indicates that at least one additional event signal has been activated, the computer system 200 remains in the interrupt mode. The interrupt control system 208 continues to provide the interrupt request signal 216 to the core 202, and the process repeats for the currently highest priority event. The process can repeat until no event signals are activated. Once all of the event signals are processed, the computer system 200 returns to the normal mode of operation. Since the interrupt control system 208 can provide the branch instruction directly to the processor core from the internal ISR table, the interrupt latency time can be reduced relative to existing computer systems. The interrupt control system 208 can be implemented as a single block (e.g., an IP core) on an integrated circuit chip, which chip can also include the processor core 202.

Figure 3:
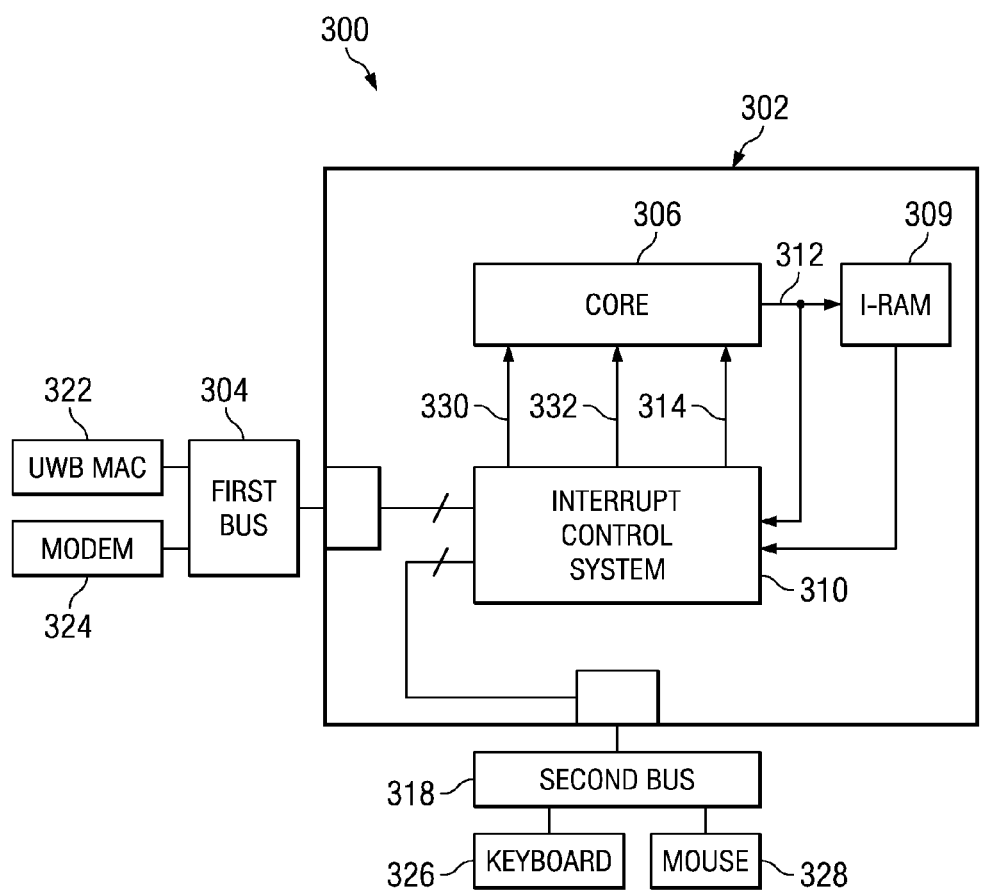
FIG. 3 illustrates an example of a computer system implemented with an interrupt control system in accordance with an aspect of the invention.

FIG. 3 illustrates a computer system 300 that implements an interrupt control system in accordance with an aspect of the invention. The computer system 300 includes at least one processor 302 and data bus 304. The processor 302 can be implemented as a single integrated circuit. The processor 302 includes a core 306 and I-RAM 308. In the present example, the processor 302 could be implemented as an ARM processor. An interrupt control system 310 is connected between the core 306 and the I-RAM 308. In the present example, the interrupt control system 310 could be implemented as VIC; however, other forms of interrupt controllers could be used.

The interrupt control system 310 receives event signals from the at least one bus structure 304. The data bus 304 could be implemented as a peripheral component interconnect (PCI) bus. In the present example, an UWB MAC controller 322 and a modem 324 are connected to the bus 304. Typically, peripheral devices connected to the PCI bus 316 have a high data rate (e.g., 1000 Mbps). One of ordinary skill in the art would appreciate that other peripheral devices (e.g., a graphics processor or expansion cards) could also or alternatively be connected to the bus 304. Additionally or alternatively, a second data bus 318 or additional buses can be included, each of which can provide one or more event signals to the interrupt control system 310. The second data bus 318 could be implemented as a universal serial bus (USB), for example. Typically, USB devices have a low to medium data rate (e.g., 4 Mbps). A keyboard 326 and a mouse 328 are connected to the second bus 318. It is to be understood that additional or alternative data buses could be implemented (e.g., PCI-express, industry standard architecture, as well as other known and proprietary buses) in the system 300.

In the present example, peripheral devices 322, 324, 326, 328 connected to either first bus 304 or the second bus 318 can activate one or more event signals. Typically, each peripheral device can be associated with a single (e.g., unique) event signal to maximize performance. Alternatively, multiple peripheral devices can share a given interrupt, such as by the use of level-triggered interrupts. Each event signal can be assigned a predetermined priority level. Additionally or alternatively, each event signal could also be assigned a priority class. In the present example, event signals in a first class (e.g., FIQ) have a higher priority than event signals in a second class (e.g., IRQ). Event signals within the same class can be assigned a priority level to indicate the event signal's priority relative to other event signals of the same class. Thus, a signal with the highest priority will be the event signal in the highest priority class with the highest priority level. Usually, event signals are processed in the order of priority, from highest priority to lowest priority.

In the present example, the interrupt control system 310 can provide an interrupt request signal to the core 306 in response to one or more event signals being activated. The interrupt control system 310 can provide separate interrupt request signals 330 and 332 that can indicate the priority class of the at least one activated event signal (e.g., FIQ or IRQ). The interrupt control system 310 typically stores at least one computer executable instruction associated with each event signal. The at least one computer executable instruction can be loaded (e.g., by firmware) into the interrupt control system 310 during an initialization or power up cycle. The computer executable instructions can be implemented as branch instructions. A branch instruction, when executed by the core, will direct the core 306 to the ISR for the peripheral (or other device) that is associated with the activated event signal.

In the present example, the computer system 300 can operate in either a normal mode of operation or an interrupt mode of operation. The normal mode of operation occurs when no event signal has been activated. In the normal mode of operation, the core 306 will intermittently provide instruction requests to the I-RAM 308. In response to the instruction requests, the I-RAM 308 provides the interrupt control system 310 with an instruction signal. During the normal mode of operation (e.g., no interrupts), the interrupt control system 310 passes the instruction signal from the I-RAM 308 directly to the core 306 on the core's instruction bus 314.

In the present example, the interrupt mode of operation occurs when at least one event signal has been activated. When at least one event signal has been activated, the interrupt control system 310 sets the status of event signal in a status register to indicate that the particular event signal has been activated. The interrupt control system 310 also provides the core 306 with an interrupt request signal indicative of the priority class for the at least one activated event signal. The core 306 will provide the I-RAM 308 with an instruction request. The interrupt control system 310 detects the instruction request and examines it. If the instruction request is within a predefined set of instruction requests, such as a request for a specific memory address (e.g., 0x18 for IRQ or 0x1F for FIQ), then the detected signal is determined to be an interrupt response. If the interrupt control system 310 detects an interrupt response, the interrupt control system 310 will provide the core 306 with a branch instruction corresponding to the event signal with the highest priority. For instance, the interrupt control system 310 provides the branch instruction for the highest activated priority level from a data table (e.g., an ISR table) stored therein. The interrupt control system 310 thus can block transmission of instruction signal from the I-RAM 308 based on the signal detected on the bus 312. The core 306 can execute the branch instruction and the associated ISR.

After the interrupt control system 310 provides the core with the branch instruction, the interrupt control system 310 resets the status of the event signal in the status register to indicate that the associated event signal is no longer activated. If one or more event signals are still activated, the computer system 300 continues to operate in the interrupt mode of operation. The interrupt control system 310 continues to provide an interrupt request signal indicative of the event signal that currently has the highest priority, and the process repeats for the event signal that currently has the highest priority. Once all of the event signals have been processed, the computer system 300 returns to the normal mode of operation until another event is activated. By providing the branch instruction directly from the interrupt control system the processor core 306, the system 300 can operate with reduced interrupt latency relative to other types of systems.

Figure 4:
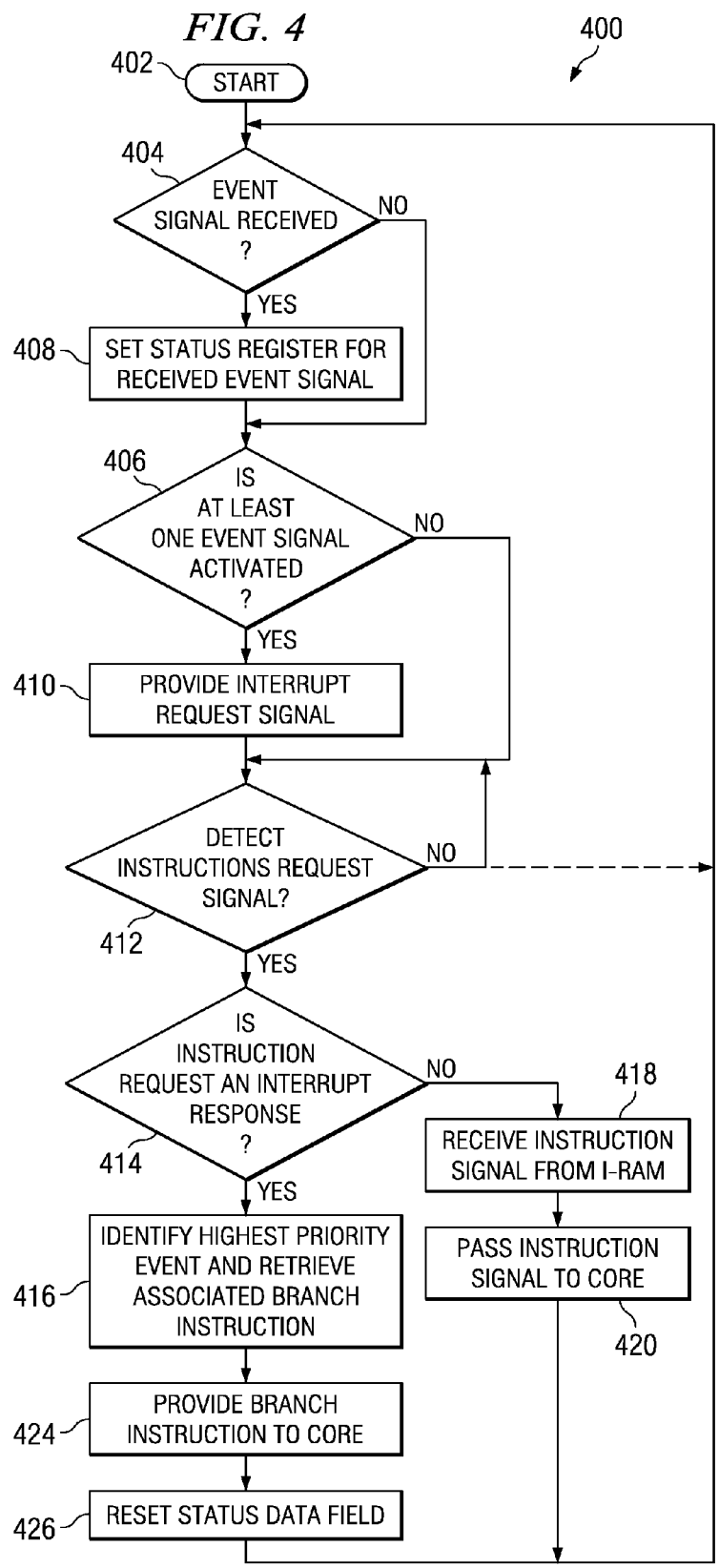
FIG. 4 illustrates a flow diagram of a method that can be utilized to process event signals in accordance with an aspect of the invention.

FIG. 4 illustrates a flow diagram of a method 400 that can be utilized to reduce interrupt latency time in a computer system in accordance with an aspect of the invention. The method could be implemented using an ARM processor, although other processors could be used. The method 400 starts at 402, such as in conjunction with a power up cycle. The power up cycle can also include initialization of a data table (e.g., writing branch instructions for each of a plurality of event signals provided at respective interrupt inputs. The method proceeds to 404 in which determination is made as to whether an event signal has been received. For instance, an interrupt control system can monitor the plurality of event signals associated with respective peripheral devices connected with the computer system via one or more bus architectures. Event signals can have a priority level. Additionally or alternatively, the event signals can have a priority class. Event signals in the first class, FIQ, can have a higher priority than signals in the second class, IRQ. However, both priority classes could include event signals within the class at different priority levels as well. An event signal could be activated by, for example, a computer's peripheral devices or by an internal co-processor. If the determination made at 404 indicates that an event signal has not been activated (NO), the method proceeds to 406 (discussed below).

If the determination made at 404 indicates that at least one event signal has been activated (e.g., asserted to a predetermined logic level) (YES), the method proceeds to 408. At 408, a status register for the received signal is set. For example, the interrupt control system can set a status field to indicate that an event corresponding to the status field has been activated. The status field can include, for example, one or bits of memory at a particular memory address that indicates that a particular event signal has been activated. The status register contains a status field for any number of event signals, although there are usually 32 or less event signals. At 406, another determination is made as to whether at least one event signal is activated. The determination can be made based on the state of one or more fields in the status register. If one or more event signals are activated, the method proceeds to 410. At 410, an interrupt request signal is provided to the processor core. For instance, control logic can generate the interrupt request (e.g., an IRQ or FIQ) when one or more event signals are activated. In response to interrupt request signal, the core will provide the I-RAM with an instruction request signal. If the determination made at 406 is negative (no event signal is activated) as well as from 410, the method proceeds to 412.

At 412, a determination is made as to whether an instruction request signal from the processor core has been detected. If no instruction request signal is detected, the method loops at 412 until an instruction request signal is detected. Alternatively, the method can proceed from 412 to 404. This can correspond to the signal from the processor core to the I-RAM corresponding to an instruction request other than an interrupt response. If an instruction request signal is detected (YES), the method proceeds from 412 to 414. At 414, a determination is made as to whether the instruction request corresponds to an interrupt response. For example, the determination at 414 can ascertain that the instruction request signal is an interrupt response based on the address in the request corresponding to a predefined interrupt address (e.g., an IRQ or FIQ address). If the instruction request is an interrupt response (YES, corresponding to the interrupt mode), the method proceeds to 416. If the instruction request is not an interrupt response is (NO, corresponding to the normal mode), the method proceeds to 418.

At 416, the event signal with a highest priority is identified and the associated branch instruction is retrieved. For example, the event with the highest priority will be the event having the highest priority level, which may be in the highest priority class. Control logic can read the branch instruction from the corresponding ISR table. The method proceeds to 424 and the branch instruction is provided to the process core. The method proceeds to 426, wherein the status field (e.g., in the status register) is reset to indicate that the event signal is no longer activated since the interrupt has been (or is being processed). The method then returns from 426 to 404, or alternatively (or concurrently) it may return to 406.

At 418, an instruction signal is received from I-RAM and the method proceeds to 420. For instance, a switch system (e.g., a multiplexer) can receive the instruction signal from the I-RAM in response to the instruction request signal from the processor core. At 420, being in the normal operating mode, the instruction signal provided by the I-RAM is passed to the core. From 420, the method then returns to 404, and then repeats.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. An interrupt control system comprising:
control logic that provides at least one interrupt request signal to a processor in response to at least one event signal;
the control logic further comprising:
a data table that stores at least one computer executable instruction; and
a switch that includes a first input that receives an instruction provided by an instruction random access memory in response to an instruction request from the processor, a second input of the switch receives a computer executable instruction from the data table in response to detecting that the instruction request from the processor corresponds to an interrupt response, the switch being controlled to provide to the processor one of the instruction received from the instruction random access memory or the computer executable instruction selected based on the instruction request from the processor.

2. The interrupt control system of claim 1, wherein the data table comprises an interrupt service routine (ISR) table and the at least one computer executable instruction comprises at least one branch instruction.

3. The interrupt control system of claim 1, wherein the at least one event signal comprises a plurality of event signals, each of the event signals having a predetermined priority level relative to each other.

4. The interrupt control system of claim 1, wherein the control logic further comprises a detector for detecting that the instruction request from the processor corresponds to the interrupt response; and
the detector controlling the switch to provide to the processor one of the computer executable instruction and the instruction provided by the instruction random access memory based on the instruction request from the processor.

5. The interrupt control system of claim 1, wherein the at least one event signal comprises a plurality of event signals, wherein each of the plurality of event signals has a predetermined priority level and an associated class, at least two event signals having a first class that is at a higher priority than at least one event signal having a second class.

6. The system of claim 1, wherein the switch comprises a multiplexer that is configured to connect one of the first and second inputs to provide to the processor the one of the instruction received from the instruction random access memory or the computer executable instruction selected based on the instruction request from the processor.

7. The interrupt control system of claim 2, wherein the ISR table is programmed with the at least one branch instruction associated with each respective at least one event signal.

8. The interrupt control system of claim 3, wherein the control logic provides the at least one computer executable instruction associated with the event signal having a highest priority level.

9. The interrupt control system of claim 5, wherein the plurality of event signals comprises at least two event signals having the first class.

10. The interrupt control system of claim 8, wherein the control logic further comprises priority selection logic that identifies which of the plurality of event signals has the highest priority to enable the control logic to provide the at least one computer executable instruction associated with the event signal having the highest priority.

11. An interrupt control system comprising:
means for detecting at least one event signal and for providing an interrupt request signal to a processor in response to the at least one event signal;
means for providing at least one computer executable instruction to the processor in response to detecting an interrupt response from the processor;
means for receiving an instruction from instruction random access memory in response to the instruction request from the processor; and
means for selectively providing the processor with one of the instruction received from the instruction random access memory and the at least one computer executable instruction in response to detecting the instruction request from the processor corresponding to the interrupt response.

12. The interrupt control system of claim 11, further comprising means for storing the at least one computer executable instruction as a plurality of branch instructions, each of the plurality of branch instructions being associated with a respective one of the plurality of event signals.

13. A method, comprising:
receiving at least one event signal from a peripheral device indicating the occurrence of an interrupt event;
setting a status field associated with the at least one event signal in response to the receiving of the at least one event signal;
providing an interrupt request signal to a processor in response to the event signal;
detecting an instruction request sent from the processor to an instruction random access memory (I-RAM);
retrieving at least one computer executable instruction that is associated with the at least one event signal if the instruction request is an interrupt response from the processor;
providing the at least one computer executable instruction to the processor; and
resetting the status field in the status register associated with the least one event signal in response to the at least one computer executable instruction being provided to the processor.

14. The method of claim 13, further comprising:
receiving a plurality of event signals, each of the event signals having a relative priority level;
determining which of the plurality of event signals has a highest relative priority level, the retrieved at least one computer executable instruction being associated with the event signal determined to have the highest priority level.

15. The method of claim 13, further comprising:
receiving an instruction signal from I-RAM that is provided in response to the instruction request sent from the processor to the I-RAM; and
selectively providing to the processor one of the instruction signal from the I-RAM or the retrieved at least one computer executable instruction that is associated with the event signal based on the detected instruction request sent from the processor to the I-RAM.

* * * * *